United States Patent [19]

Spies et al.

[11] Patent Number: 5,386,642
[45] Date of Patent: Feb. 7, 1995

[54] POSITION MEASURING INSTRUMENT

[75] Inventors: Alfons Spies, Seebruck; Gerald Metz, St. Georgen, both of Germany

[73] Assignee: Dr. Johannes Heidenhain GmbH, Germany

[21] Appl. No.: 13,704

[22] Filed: Feb. 4, 1993

[30] Foreign Application Priority Data

Feb. 4, 1992 [DE] Germany ............... 4203073

[51] Int. Cl.$^6$ ............................................. G01B 7/14
[52] U.S. Cl. ........................................ 33/708; 33/706; 324/207.21; 338/32 R
[58] Field of Search ............... 33/708, 706; 324/207.21; 338/32 R

[56] References Cited

U.S. PATENT DOCUMENTS

| | | |
|---|---|---|
| 4,346,447 | 8/1982 | Takahama . |
| 4,403,187 | 9/1983 | Takahashi et al. ............. 324/207.21 |
| 4,594,548 | 6/1986 | Takahashi et al. ............. 338/32 R |
| 5,036,276 | 7/1991 | Aizawa ...................... 338/32 R |
| 5,047,716 | 9/1991 | Katagiri . |
| 5,074,929 | 12/1991 | Bradley et al. . |

FOREIGN PATENT DOCUMENTS

| | | |
|---|---|---|
| 0112463 | 7/1984 | European Pat. Off. . |
| 151002 | 8/1985 | European Pat. Off. . |
| 0415576 | 3/1991 | European Pat. Off. . |
| 0178816 | 7/1989 | Japan ...................... 338/32 R |

OTHER PUBLICATIONS

Ernst, "Precise Positioning with Linear Encoders," Machine Design, vol. 60, No. 17, Jul. 21, 1988, pp. 77–83.

Primary Examiner—Alvin Wirthlin
Attorney, Agent, or Firm—Willian Brinks Hofer Gilson & Lione

[57] ABSTRACT

A position measuring instrument for measuring the relative position of two objects movable relative to one another. The position measuring instrument comprises a periodic measurement scale division having a period t and a scanner unit, wherein the scanner unit and the periodic measurement scale division move relative to one another in a measuring direction. In addition, the scanner unit comprises four groups (A–D) each comprising at least four magnetoresistive elements ($A_n$–$D_n$) ($n=1, 2, 3, 4, \ldots$), which are interconnected in the form of a series-parallel circuit to form a half bridge circuit having an upper branch and a lower branch. The upper branch comprises a magnetoresistive element from each group (A–D) and the lower branch comprises a corresponding magnetoresistive element from each group (A–D). Furthermore, the magnetoresistive elements of the upper branch are offset from the corresponding magnetoresistive elements of the lower branch by t/2. The position measurement instrument further comprises an evaluation device to form position measurement values from position-dependent output signals generated by the magnetoresistive elements in response to relative movement between the periodic measurement scale division and the scanner unit.

30 Claims, 4 Drawing Sheets

POSITION MEASURING INSTRUMENT

BACKGROUND OF THE INVENTION

Applicants claim, under 35 U.S.C. §119, the benefit of priority of the filing date of Feb. 4, 1992, of a German application, copy attached, Serial Number P 42 03 073.0, filed on the aforementioned date, the entire contents of which are incorporated herein by reference.

FIELD OF THE INVENTION

The invention relates to a magnetic position measuring instrument for measuring the relative position of two objects movable relative to one another. In particular a periodic measuring scale division is scanned in the measurement direction by a scanner unit using magnetoresistive elements to generate position-dependent output signals, from which position measurement values are formed in an evaluation device.

A position measuring instrument of this kind is used particularly in a machining tool for measuring the relative position of a tool with respect to a workpiece to be machined.

DESCRIPTION OF RELATED ART

European Patent Disclosure B10 151 002 describes a magnetic position measuring instrument for measuring the relative position of two objects movable relative to one another, in which a measurement scale division has alternatingly magnetically conductive and magnetically nonconductive regions in the measuring direction. The magnetically conductive and nonconductive regions are scanned by a scanner unit with a permanent magnet, shown in FIG. 19 of this reference, by means of two groups each comprising four magnetoresistive elements for producing position-dependent output signals.

The four magnetoresistive elements of each group are interconnected in the form of a series circuit to make a half bridge circuit. However, this measuring instrument has the disadvantage that only two periods of the measurement scale division are scanned by the two groups each comprising four magnetoresistive elements, so that because of inaccuracies in the measurement scale division the position-dependent output signals obtained generally do not have optimal signal parameters (amplitudes and mutual phase relationship). Since the magnetoresistive elements are interconnected in the form of a series circuit to make two half bridge circuits, an increase in the number of magnetoresistive elements of each group to scan additional periods of the measurement scale division is not readily possible, because otherwise the bridge resistance of the two bridge circuits would become too high. In such a case, a high voltage would have to be applied to the half bridge circuits, in order to feed a predetermined current intensity.

Accordingly, it is an object of the present invention to disclose a disposition and interconnection of magnetoresistive elements that in a simple way permits position-dependent output signals with optimal signal parameters to be obtained.

SUMMARY OF THE INVENTION

The above-mentioned object and other objects of the invention are achieved with a position measuring instrument for measuring the relative position of two objects movable relative to one another. The position measuring instrument comprises a periodic measurement scale division having a period t and a scanner unit, wherein the scanner unit and the periodic measurement scale division move relative to one another in a measuring direction. In addition, the scanner unit comprises four groups (A-D) each comprising at least four magnetoresistive elements $(A_n-D_n)$ (n=1, 2, 3, 4, . . .) which are interconnected in the form of a series-parallel circuit to form a half bridge circuit having an upper branch and a lower branch. The upper branch comprises a magnetoresistive element from each group (A-D) and the lower branch comprises a corresponding magnetoresistive element from each group (A-D). Furthermore, the magnetoresistive elements of the upper branch are offset from the corresponding magnetoresistive elements of the lower branch by t/2. The position measurement instrument further comprises an evaluation device to form position measurement values from position-dependent output signals generated by the magnetoresistive elements in response to relative movement between the periodic measurement scale division and the scanner unit.

In another embodiment, the position measuring instrument comprises a periodic measurement scale division having a period t and a scanner unit, wherein the scanner unit and the periodic measurement scale division move relative to one another in a measuring direction. In addition, the scanner unit comprises four groups (A-D) each comprising at least four magnetoresistive elements $(A_n-D_n)$ (n=1, 2, 3, 4, . . .) which are interconnected in the form of a series-parallel circuit to form a full bridge circuit having a left-hand branch and a right-hand branch. The left-hand branch comprises a magnetoresistive element from each group (A-D) and the right-hand branch comprises a corresponding magnetoresistive element from each group (A-D). The magnetoresistive elements of the left-hand branch are offset from the corresponding magnetoresistive elements of the right-hand branch by t/2. Furthermore, the position measuring instrument comprises an evaluation device to form position values from position-dependent output signals generated by the magnetoresistive elements in response to relative movement between the periodic measurement scale division and the scanner unit.

In a third embodiment, the position measuring instrument comprises a periodic measurement scale division having a period t and a scanner unit, wherein the scanner unit and the periodic measurement scale division move relative to one another in a measuring direction. In addition, the scanner unit comprises four groups (A-D) each comprising at least four magnetoresistive elements $(A_n-D_n)$ (n=1, 2, 3, 4, . . .) which are interconnected in the form of a series-parallel circuit to form a full bridge circuit having an upper branch and a lower branch. The upper branch comprises a magnetoresistive element from each group (A-D) and the lower branch comprises a corresponding magnetoresistive element from each group (A-D). The magnetoresistive elements of the upper branch are offset from the corresponding magnetoresistive elements of the lower branch by t/2. Furthermore, the position measuring instrument comprises an evaluation device to form position measurement values from position-dependent output signals generated by the magnetoresistive elements in response to relative movement between the periodic measurement scale division and the scanner unit.

The advantages attained with the present invention are in particular that the position-dependent output signals obtained by the proposed disposition and interconnection of the magnetoresistive elements can, because of their optimal signal parameters, be subjected to subsequent interpolation with a high degree of subdivision, making it possible to further increase the accuracy and resolution of measurement; moreover, because of the relatively low bridge resistance of the half bridge or full bridge circuits, with a series-parallel circuit of magnetoresistive elements, the voltage required to feed a predetermined current intensity can be in a lower range.

Exemplary embodiments of the invention will be described in further detail below in conjunction with the drawings.

DESCRIPTION OF THE PREFERRED EMBODIMENTS

Figure 1:
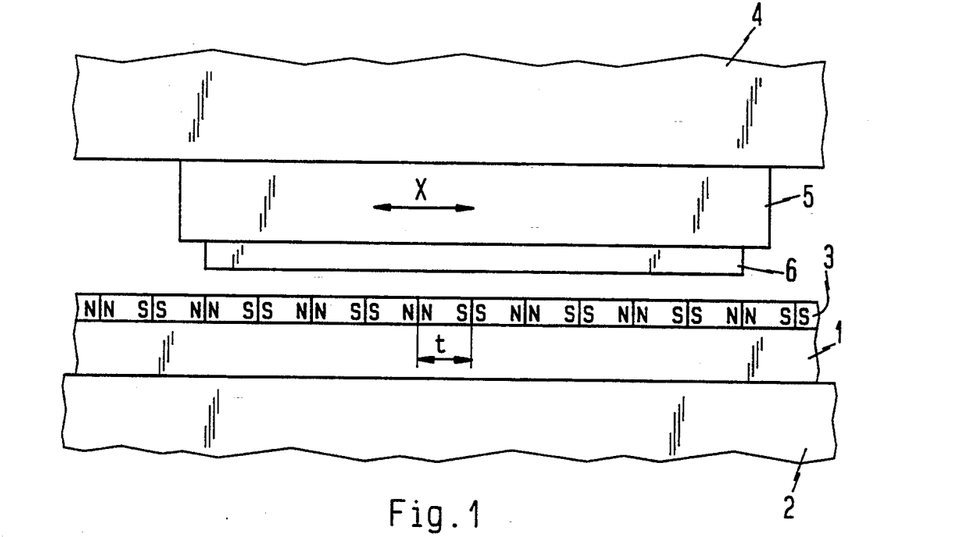
FIG. 1 is a lengthwise view of a first embodiment of a position measuring instrument according to the present invention.

FIG. 1 schematically shows a lengthwise view of a first position measuring instrument, in which a material measure 1 comprising a magnetizable material is secured in some arbitrary way to a first object 2. The material measure 1 has a periodic measurement scale division 3 on one surface, with opposite-poled magnetized regions NS of alternatingly opposite polarity in the measurement direction X, with two north poles NN and two south poles SS adjacent to one another at the boundaries of the regions. The measurement scale division 3 has a division period t, which is defined by the pole spacing of each region NS. A scanner unit 5 is connected to a second object 4 and scans the measurement scale division 3 of the material measure 1 to obtain position measuring values for the relative position of the two objects 2, 4. Scanning is accomplished by having the measurement scale division 3 and scanner unit 5 moving relative to one another in the measuring direction X. These two objects 2, 4 may be embodied by two machine parts of a machining tool, not shown. The scanner unit 5 is provided with a scanning plate 6 on whose free surface four groups A, B, C, D are arranged, each comprising at least four magnetoresistive elements $A_n$, $B_n$, $C_n$, $D_n$ (where n=1, 2, 3, 4).

Figure 2A:
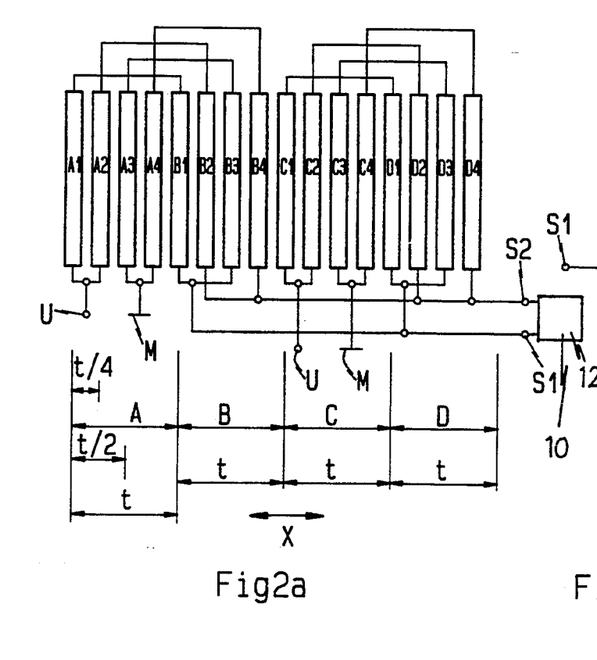
FIGS. 2a-c show a first embodiment of interconnection of magnetoresistive elements to make two half bridge circuits according to the present invention.

In FIG. 2a, these strip-like magnetoresistive elements $A_n$–$D_n$ extend at right angles to the measuring direction X and are arranged in the measuring direction X parallel to one another, each spaced apart by a mutual spacing t/4. Similarly, when there are m (m=4, 5, . . .) total magnetoresistive elements ($A_n$–$D_n$), of each group (A–D), their respective mutual spacing is t/m. Furthermore, each group A–D of m magnetoresistive elements $A_n$–$D_n$ extends in the measuring direction X over a period t of the measurement scale division 3.

Figures 2B, 2C:
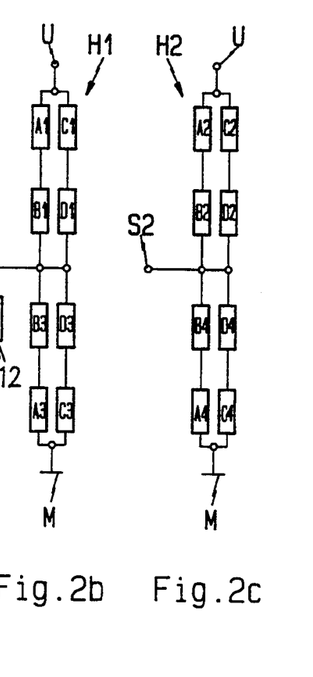

In FIGS. 2b and 2c, the magnetoresistive elements $A_n$–$D_n$ are interconnected in the form of a series-parallel circuit to form two half bridge circuits H1, H2, each of which is connected by one pole to a voltage U and by the other pole to ground M. Each half bridge circuit comprises two quarter bridges having at least four magnetoresistive elements $A_n$–$D_n$ interconnected arbitrarily among one another. Upon the measurement motion of the scanner unit 5 with respect to the measurement scale division 3, a first periodic output signal S1 having the phase position of 0° is present at the center pickup of the first half bridge circuit H1, and a second periodic output signal S2 having the phase position of 90° is present at the center pickup of the second half bridge circuit H2. The signal periods of these signals correspond to the period t of the measurement scale division 3. Furthermore, the phase difference of 90° between the two periodic output signals S1, S2 makes it possible to discern the measurement direction X. The two periodic output signals S1, S2 are delivered to an evaluation unit 10 or device having an interpolation unit 12 for obtaining position measurement values. Due to the so-called single-field scanning, the two output signals S1, S2 have optimal signal parameters (i.e., high zero point stability, identical amplitudes and a constant mutual phase difference) over four periods t of the measurement scale division 3, they can be subdivided in the interpolation unit with a high degree of subdivision, making for greater measurement accuracy and resolution even if there are division inaccuracies in the measurement scale division 3.

The magnetoresistive elements $A_1$, $B_1$, $C_1$, $D_1$ of each group A–D of the upper bridge branch of the first half bridge circuit H1 are shifted by the amount t/2 from the corresponding magnetoresistive elements $A_3$, $B_3$, $C_3$, $D_3$ of their group A–D of the lower bridge branch. Similarly, the magnetoresistive elements $A_2$, $B_2$, $C_4$, $D_4$ of each group A–D of the upper bridge branch of the second half bridge circuit H2 are shifted by the amount t/2 from the corresponding magnetoresistive elements $A_4$, $B_4$, $C_2$, $D_2$ of their group A–D of the lower bridge branch.

Figure 3A:
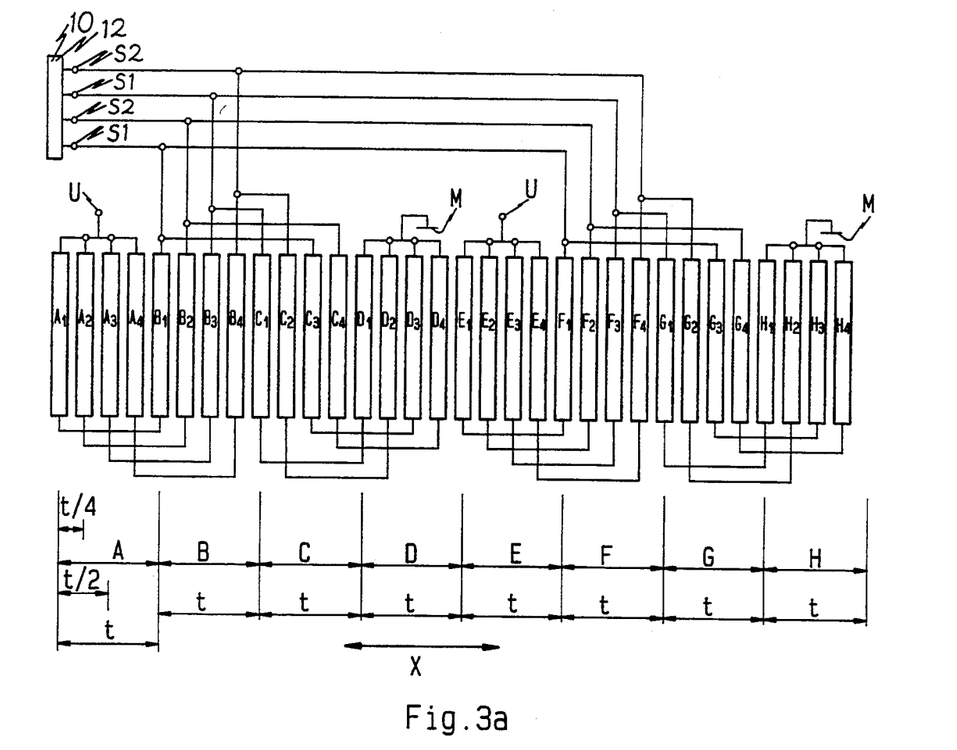
FIGS. 3a-c show a second embodiment of interconnection of magnetoresistive elements to make two full bridge circuits according to the present invention.

In FIG. 3a, eight groups A–H, each comprising at least four magnetoresistive elements $A_n$–$H_n$ (where n=1, 2, 3, 4) are disposed on the scanning plate 6 of the scanner unit 5. The magnetoresistive elements $A_n$–$H_n$ are interconnected in the form of a series circuit to make two full bridge circuits V1, V2 (FIGS. 3b and 3c), which are connected by one pole to a voltage U and by the other to ground M. Each full bridge circuit comprises four quarter bridges having at least four magnetoresistive elements ($A_n$–$D_n$ or $E_n$–$H_n$) interconnected arbitrarily among one another. Upon the measurement motion of the scanner unit 5 with respect to the measurement scale division 3, a first periodic signal S1 having the phase position 0° is present at the two center pickups of the first full bridge circuit V1, and a second periodic output signal S2 having the phase position 90° is present at the two center pickups of the second full bridge circuit V2. In addition, the signal periods of these signals correspond to the period t of the measurement scale division 3 and the phase difference of 90° between the two periodic output signals S1, S2 makes it possible to discern the measurement direction X. These two periodic output signals S1, S2 are likewise delivered to the evaluation unit 10 having the interpolation unit 12 for obtaining position measurement values. Due to the so-called single-field scanning the two output signals S1, S2 have optimal signal parameters (high zero point stability, identical amplitudes and a constant mutual phase difference) over eight periods t of the measurement scale division 3, they can be subdivided in the interpolation unit with a high degree of subdivision, making for greater measurement accuracy and resolution even if there are division inaccuracies in the measurement scale division 3.

Figure 3B:
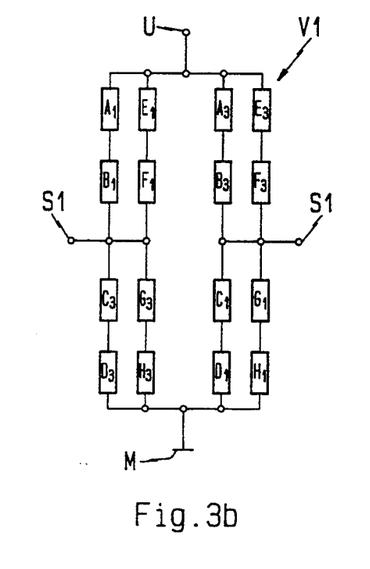
Figure 3C:
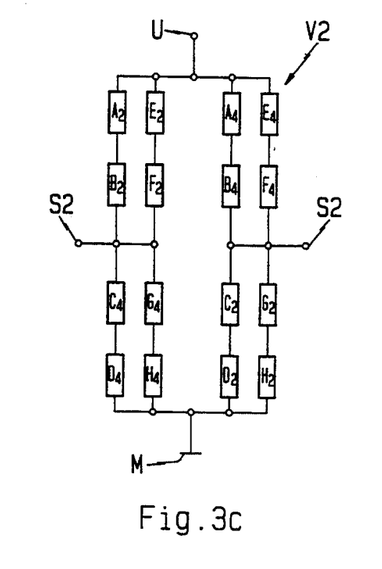

The magnetoresistive elements $A_1$, $B_1$, $C_3$, $D_3$, $E_1$, $F_1$, $G_3$, $H_3$ of each group A–H of the left-hand bridge branch of the first full bridge circuit V1 are shifted by the amount t/2 from the corresponding magnetoresistive elements $A_3$, $B_3$, $C_1$, $D_1$, $E_3$, $F_3$, $G_1$, $H_1$ of their group A–H of the right-hand bridge branch. Similarly, the magnetoresistive elements $A_2$, $B_2$, $C_4$, $D_4$, $E_2$, $F_2$, $G_4$, $H_4$ of each group A–H of the left-hand bridge branch of the second full bridge circuit V2 are shifted by the amount t/2 from the corresponding magnetoresistive elements $A_4$, $B_4$, $C_2$, $D_2$, $E_4$, $F_4$, $G_2$, $H_2$ of their group A–H of the right-hand bridge branch.

Figure 4A:
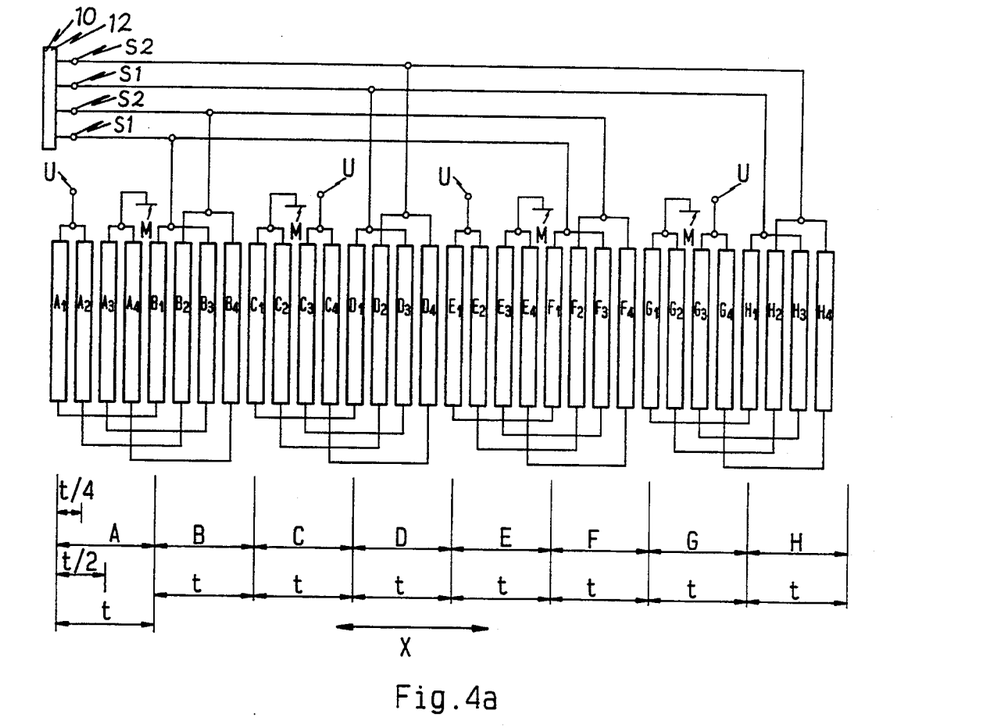
FIGS. 4a-c show a third embodiment of interconnection of magnetoresistive elements to make two full bridge circuits according to the present invention.

In FIG. 4a, once again eight groups A–H, each comprising four magnetoresistive elements $A_n$–$H_n$ (where n=1, 2, 3, 4) are disposed on the scanning plate 6 of the scanner unit 5. The magnetoresistive elements $A_n$–$H_n$ are interconnected in the form of a series circuit to make two full bridge circuits V1, V2 (FIGS. 4b and 4c), which are connected by one pole to a voltage U and by the other to ground M. Upon the measurement motion of the scanner unit 5 with respect to the measurement scale division 3, a first periodic signal S1 having the phase position 0° is present at the two center pickups of the first full bridge circuit V1, and a second periodic output signal S2 having the phase position 90° is present at the two center pickups of the second full bridge circuit V2. Furthermore, the signal periods of these signals correspond to the period t of the measurement scale division 3 and the phase difference of 90° between the two periodic output signals S1, S2 makes it possible to discern the measurement direction X. These two periodic output signals S1, S2 are likewise delivered to the evaluation unit having the interpolation unit for obtaining position measurement values. Due to the so-called single-field scanning the two output signals S1, S2 have optimal signal parameters (high zero point stability, identical amplitudes and a constant mutual phase difference) over eight periods t of the measurement scale division 3, they can be subdivided in the interpolation unit with a high degree of subdivision, making for greater measurement accuracy and-resolution even if there are division inaccuracies in the measurement division 3.

Figure 4B:
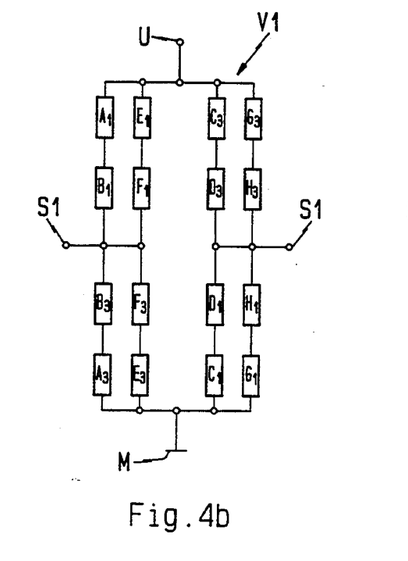
Figure 4C:
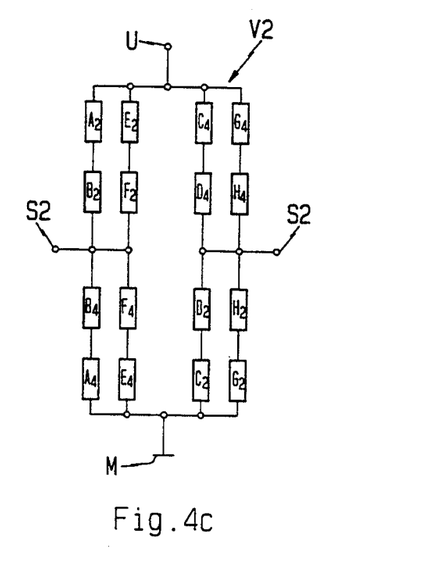

The magnetoresistive elements $A_1$, $B_1$, $C_3$, $D_3$, $E_1$, $F_1$, $G_3$, $H_3$ of each group A–H of the upper bridge branch of the first full bridge circuit V1 are shifted by the amount t/2 from the corresponding magnetoresistive elements $A_3$, $B_3$, $C_1$, $D_1$, $E_3$, $F_3$, $G_1$, $H_1$ of their group A–H of the lower bridge branch. In the same way, the magnetoresistive elements $A_2$, $B_2$, $C_4$, $D_4$, $E_2$, $F_2$, $G_4$, $H_4$ of each group A–H of the upper bridge branch of the second full bridge circuit V2 are shifted by the amount t/2 from the corresponding magnetoresistive elements $A_4$, $B_4$, $C_2$, $D_2$, $E_4$, $F_4$, $G_2$, $H_2$ of their group A–H of the lower bridge branch.

The effect of the single-field scanning over at least four periods t of the measurement scale division 3 is that division inaccuracies that are less than the total scanning length are filtered out entirely or at least partially. A scanning length of m•2t (m=2, 3, . . .) also enables the complete filtering out of errors having a period length of 2t that occur. For instance, if the alternating magnetic field of the measurement scale division 3 has a direct field superimposed on it, so that the direct field is added to one magnetic flux direction and subtracted from the other magnetic flux direction, or if the magnetoresistive elements $A_n$–$H_n$ react more sensitively to one magnetic flux direction.

Figure 5:
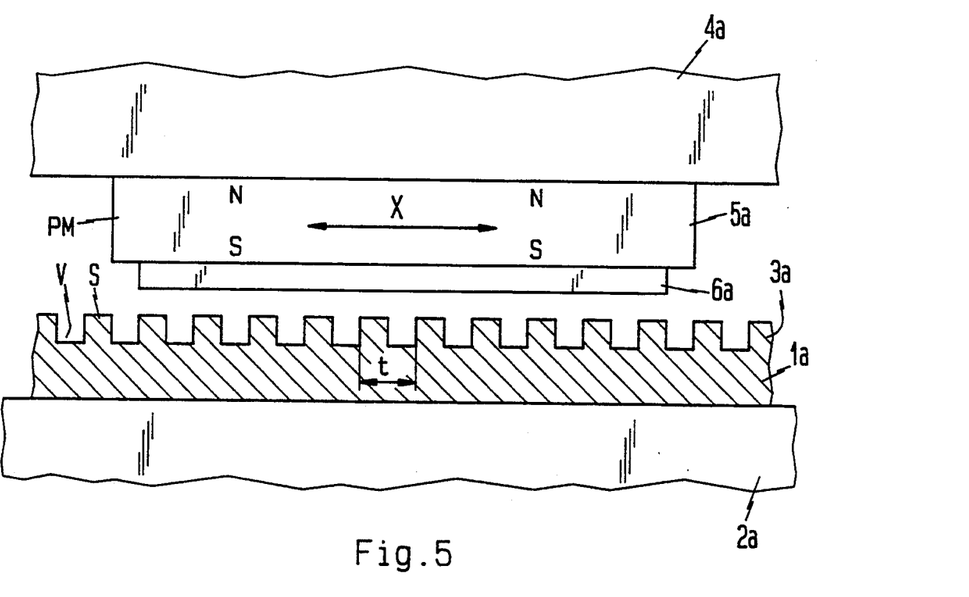
FIG. 5 is a lengthwise view of a second embodiment of a position measuring instrument according to the present invention.

FIG. 5 is a schematic lengthwise view of a second embodiment of a position measuring instrument, in which a material measure 1a of magnetically conductive material is secured in an arbitrary way to a first object 2a. The material measure 1a has a periodic measurement scale division 3a on one surface, with alternating successive lands S and indentations V of equal width in the measuring direction X. The measurement scale division 3a has a period t, which is defined by one land S and an adjacent indentation V. A scanner unit 5a is connected to a second object 4a and scans the measurement scale division 3a of the material measure 1a to obtain position measurement values for the relative position of the two objects 2a, 4a. The scanner unit 5a is provided both with a permanent magnet PM and with a scanning plate 6a, on whose free surface the groups A–D and A–H of magnetoresistive elements $A_n$–$D_n$ and $A_n$–$H_n$, respectively, are arranged as described previously in the embodiments of FIGS. 2a–c, 3a–c, and 4a–c.

In another embodiment, the periodic measurement scale division comprises alternating regions of good magnetic conductivity and poor magnetic conductivity in the measuring direction. The period of the scale division is defined by adjacent regions of good and poor magnetic conductivity.

Figure 6:
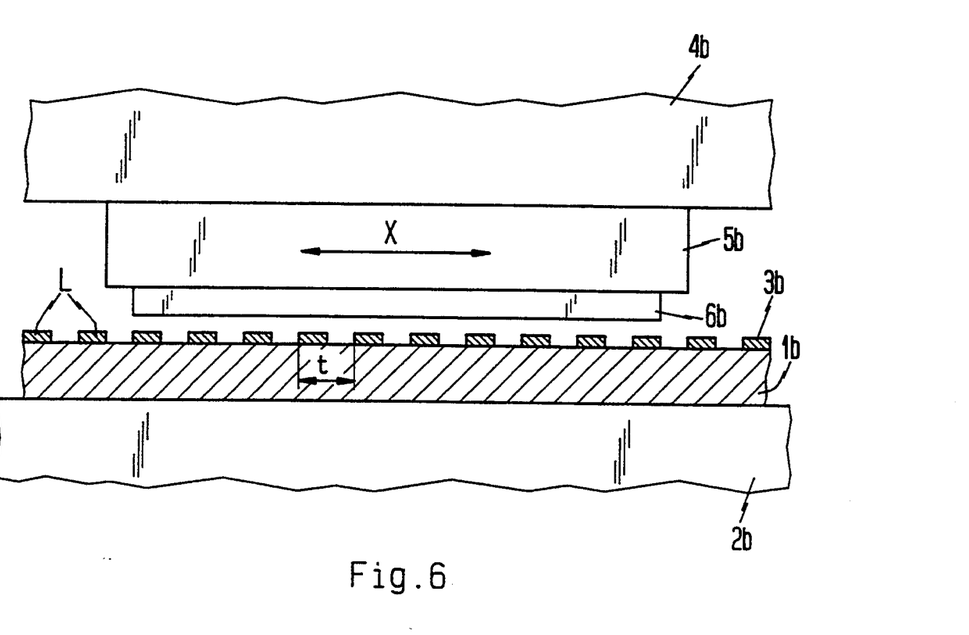
FIG. 6 is a lengthwise view of a third embodiment of a position measuring instrument according to the present invention.

FIG. 6 is a schematic lengthwise view of a second position measuring instrument, in which a material measure 1b of insulating material is secured in an arbitrary way to a first object 2b. The material measure 1b has on one surface a periodic measurement scale division 3b with a meandering conductor track, whose equidistant conductors L adjacent to one another in the measuring direction X experience a flow of current alternating through them in opposite directions. The conductors extend at right angles to the measuring direction and parallel to one another. The measurement scale division 3b has a period t that is defined by the spacing of two adjacent conductors L. A scanner unit 5b is connected to a second object 4b and scans the measurement scale division 3b of the material measure 1b to obtain position measurement values for the relative position of the two objects 2b, 4b. The scanner unit 5b is provided with a scanning plate 6b, on whose free surface the groups A–D and A–H of magnetoresistive elements $A_n$–$D_n$ and $A_n$–$H_n$, respectively, are arranged as described previously in the embodiments of FIGS. 2a–c, 3a–c, and 4a–c.

The at least four magnetoresistive elements $A_n$–$H_n$ of a quarter bridge of the half bridge circuit (H1, H2) or of the full bridge circuit (V1, V2) can be interconnected arbitrarily with one another. In particular, intermediate connections within a quarter bridge are also possible.

Each group A–H may also have more than four magnetoresistive elements $A_n$–$H_n$ (n=1, 2, 3, 4, . . .), in order to filter out harmonics having a higher order than 2.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A position measuring instrument for measuring the relative position of a first object and a second object movable relative to one another, comprising:
   a periodic measurement scale division having a period t and secured to said first object;
   a scanner unit secured to said second object, wherein said scanner unit and said periodic measurement scale division move relative to one another in a measuring direction;
   said scanner unit comprising four groups (A-D) each comprising at least four magnetoresistive elements ($A_n$-$D_n$) (n=1, 2, 3, 4, . . .), wherein said at least four magnetoresistive elements ($A_n$-$D_n$) (n=1, 2, 3, 4, . . .) of each of said four groups (A-D) are interconnected in the form of series-parallel circuits to form two half bridge circuits having an upper branch and a lower branch;
   wherein said upper branch comprises a magnetoresistive element from each group (A-D) and said lower branch comprises a corresponding magnetoresistive element from each group (A-D);
   said magnetoresistive elements of said upper branch are offset from the corresponding magnetoresistive elements of said lower branch by t/2; and
   an evaluation device to form position measurement values from position-dependent output signals generated by said magnetoresistive elements in response to relative movement between said periodic measurement scale division and said scanner unit.

2. The position measuring instrument of claim 1, wherein each group (A-D) extends over a period t of said periodic measurement scale division.

3. The position measuring instrument of claim 1, wherein when there are m (m=4, 5, . . .) total magnetoresistive elements ($A_n$-$D_n$) of each group (A-D), their respective mutual spacing is t/m.

4. The position measuring instrument of claim 1, wherein when there are four magnetoresistive elements ($A_n$-$D_n$) of each group (A-D), their respective mutual spacing is t/4.

5. The position measuring instrument of claim 1, wherein said half bridge circuit comprises a quarter bridge having at least four magnetoresistive elements interconnected arbitrarily among one another.

6. The position measuring instrument of claim 1, wherein said periodic measurement scale division comprises magnetized regions of alternatingly opposite polarity in said measuring direction.

7. The position measuring instrument of claim 1, wherein said periodic measurement scale division comprises alternating regions of good magnetic conductivity and poor magnetic-conductivity in said measuring direction.

8. The position measuring instrument of claim 7, wherein said scanner unit comprises a permanent magnet.

9. The position measuring instrument of claim 7, wherein said periodic measurement scale division comprises alternatingly successive lands and indentations in said measuring direction.

10. The measuring instrument of claim 1, wherein said evaluation device has an interpolation unit.

11. A position measuring instrument for measuring the relative position of a first object and a second object movable relative to one another, comprising:
    a periodic measurement scale division having a period t and secured to said first object;
    a scanner unit, wherein said scanner unit and said periodic measurement scale division move relative to one another in a measuring direction;
    said scanner unit comprising eight groups (A-H) each comprising at least four magnetoresistive elements ($A_n$-$H_n$) (n=1, 2, 3, 4, . . .), wherein said at least four magnetoresistive elements ($A_n$-$H_n$) (n=1, 2, 3, 4, . . .) of each of said eight groups (A-H) are interconnected in the form of a series-parallel circuit to form a full bridge circuit having a left-hand branch and a right-hand branch;
    wherein said left-hand branch comprises a magnetoresistive element from each group (A-H) and said right-hand branch comprises a corresponding magnetoresistive element from each group (A-H);
    said magnetoresistive elements of said left-hand branch are offset from the corresponding magnetoresistive elements of said right-hand branch by t/2; and
    an evaluation device to form position measurement values from position-dependent output signals generated by said magnetoresistive elements in response to relative movement between said periodic measurement scale division and said scanner unit.

12. The position measuring instrument of claim 11, wherein each group (A-H) extends over a period t of said periodic measurement scale division.

13. The position measuring instrument of claim 11, wherein when there are m (m=4, 5, . . .) total magnetoresistive elements ($A_n$-$H_n$) of each group (A-H), their respective mutual spacing is t/m.

14. The position measuring instrument of claim 11, wherein when there are four magnetoresistive elements ($A_n$-$D_n$) of each group (A-D), their respective mutual spacing is t/4.

15. The position measuring instrument of claim 11, wherein said full bridge circuit comprises a quarter bridge having at least four magnetoresistive elements interconnected arbitrarily among one another.

16. The position measuring instrument of claim 11, wherein said periodic measurement scale division comprises magnetized regions of alternatingly opposite polarity in said measuring direction.

17. The position measuring instrument of claim 11, wherein said periodic measurement scale division comprises alternating regions of good magnetic conductivity and poor magnetic conductivity in said measuring direction.

18. The position measuring instrument of claim 17, wherein said scanner unit comprises a permanent magnet.

19. The position measuring instrument of claim 17, wherein said periodic measurement scale division comprises alternatingly successive lands and indentations in said measuring direction.

20. The measuring instrument of claim 11, wherein said evaluation device has an interpolation unit.

21. A position measuring instrument for measuring the relative position of a first object and a second object movable relative to one another, comprising:
    a periodic measurement scale division having a period t and secured to said first object;

a scanner unit secured to said second object, wherein said scanner unit and said periodic measurement scale division move relative to one another in a measuring direction;

said scanner unit comprising eight groups (A–H) each comprising at least four magnetoresistive elements ($A_n$–$H_n$) (n=1, 2, 3, 4, . . .), wherein said at least four magnetoresistive elements ($A_n$–$H_n$) (n=1, 2, 3, 4, . . .) of each of said four groups (A–H) are interconnected in the form of a series-parallel circuit to form a full bridge circuit having an upper branch and a lower branch;

wherein said upper branch comprises a magnetoresistive element from each group (A–H) and said lower branch comprises a corresponding magnetoresistive element from each group (A–H);

said magnetoresistive elements of said upper branch are offset from the corresponding magnetoresistive elements of said lower branch by t/2; and an evaluation device to form position measurement values from position-dependent output signals generated by said magnetoresistive elements in response to relative movement between said periodic measurement scale division and said scanner unit.

22. The position measuring instrument of claim 21, wherein each group (A–H) extends over a period t of said periodic measurement scale division.

23. The position measuring instrument of claim 21, wherein when there are m (m=4, 5, . . .) total magnetoresistive elements ($A_n$–$H_n$) of each group (A–H), their respective mutual spacing is t/m.

24. The position measuring instrument of claim 21, wherein when there are four magnetoresistive elements ($A_n$–$H_n$) of each group (A–H), their respective mutual spacing is t/4.

25. The position measuring instrument of claim 21, wherein said full bridge circuit comprises a quarter bridge having at least four magnetoresistive elements interconnected arbitrarily among one another.

26. The position measuring instrument of claim 21, wherein said periodic measurement scale division comprises magnetized regions of alternatingly opposite polarity in said measuring direction.

27. The position measuring instrument of claim 21, wherein said periodic measurement scale division comprises alternating regions of good magnetic conductivity and poor magnetic conductivity in said measuring direction.

28. The position measuring instrument of claim 27, wherein said scanner unit comprises a permanent magnet.

29. The position measuring instrument of claim 27, wherein said periodic measurement scale division comprises alternatingly successive lands and indentations in said measuring direction.

30. The measuring instrument of claim 21, wherein said evaluation device has an interpolation unit.

* * * * *

UNITED STATES PATENT AND TRADEMARK OFFICE
CERTIFICATE OF CORRECTION

PATENT NO. : 5,386,642
DATED : February 7, 1995
INVENTOR(S) : Alfons Spies et al.

It is certified that error appears in the above-indentified patent and that said Letters Patent is hereby corrected as shown below:

Column 8,

In claim 11, line 11, delete "An-Hn" and substitute --$A_n$-$H_n$--.

In claim 14, line 3, delete each occurrence of "D" and substitute --H--.

Signed and Sealed this

Sixth Day of February, 1996

BRUCE LEHMAN

Attest:

Attesting Officer

Commissioner of Patents and Trademarks